R. W. & G. W. ARCHER.
Improvement in Dentists' and Barbers' Chairs.
No. 128,775. Patented July 9, 1872.

Witnesses.
Archer Baine
Henry Staley

Inventors.
R. W. & G. W. Archer
per R. F. Osgood
Attorney

UNITED STATES PATENT OFFICE.

ROBERT W. ARCHER AND GEORGE W. ARCHER, OF ROCHESTER, NEW YORK.

IMPROVEMENT IN DENTISTS' AND BARBERS' CHAIRS.

Specification forming part of Letters Patent No. 128,775, dated July 9, 1872.

Specification describing a certain Improvement in Attachments for Elevating the Seats of Dental, Barber, and other similar Chairs, invented by ROBERT W. ARCHER and GEORGE W. ARCHER, both of the city of Rochester, in the county of Monroe and State of New York.

Our invention consists of an attachment for raising the seats of dental and barber chairs, constructed, arranged, and operating as hereinafter described.

Figure 1:
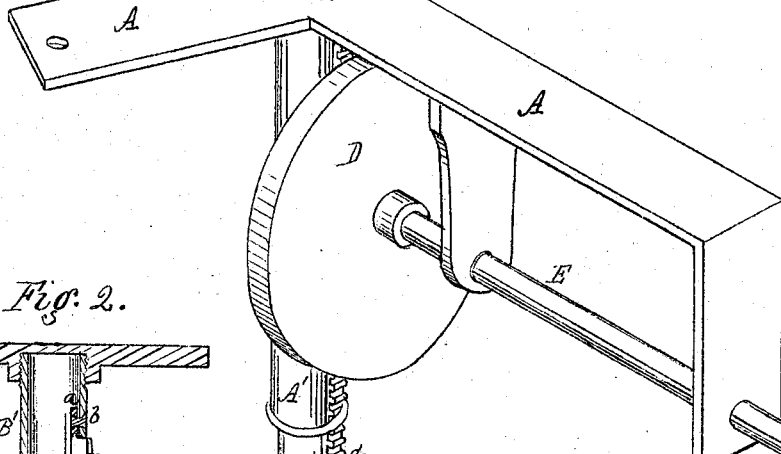
Figure 2:
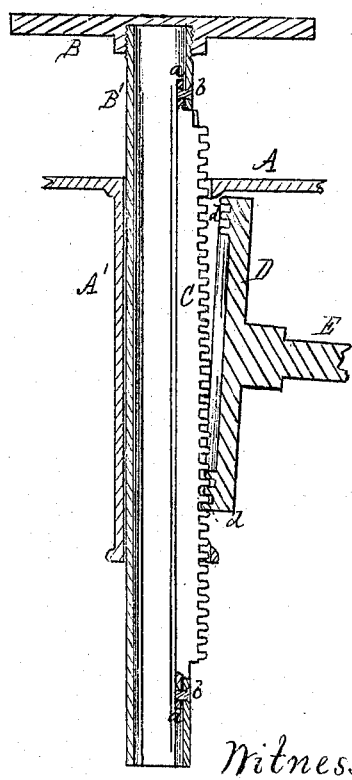
Figure 3:
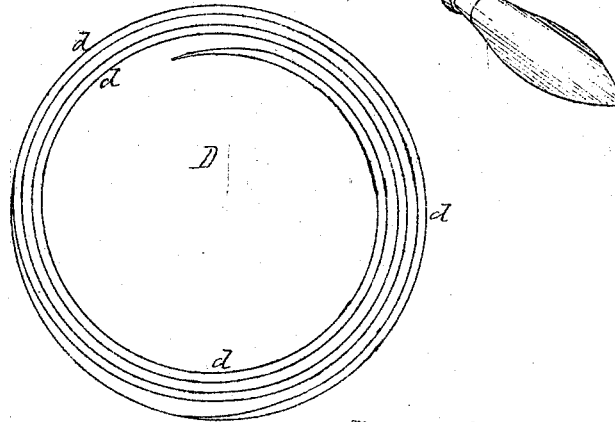

In the drawing, Figure 1 represents a perspective view of our improved attachment; Fig. 2, a vertical section of the same; Fig. 3, a face view of the threaded wheel for producing the elevating action.

A represents the frame that is attached to the stationary bottom of the chair, and B is the disk or bearing which is attached to the movable seat. The part B has a tubular shank, B′, which runs up and down in a corresponding tubular shank, A′, of the frame, by which means the parts are kept in connection at all elevations. The shank B′ is preferably made of gas-pipe, as it can be turned in a lathe and finished up without trouble, and it is cut at the top with a screw-thread, which screws into a corresponding threaded socket of the disk B. In one side of the tubular shank and also in the inclosing-shank is cut a longitudinal slot, through which, from the inside, is inserted the rack-bar C, the teeth of which project beyond the thimble sufficiently for the engagement of the threaded wheel D, as will presently be described. The rack-bar has projecting ends or lugs $a\ a$, which abut with the inner sides of the tube B′ above and below the slot, and are secured thereto, as shown at $b\ b$, Fig. 2.

This construction greatly lessens the cost of the bearing and connecting parts, since much metal as well as labor is saved.

Heretofore the rack has been cast on the rod and sunk within its surface, in which case the teeth are very imperfect in construction and cannot be dressed out. The rod has been made solid, which takes much metal, and it is heavy and clumsy. By our construction the rack can be removed and replaced at any time, and is specially adapted to the use of the angular-threaded wheel which we use, as the teeth project outward beyond the surface for its engagement.

The wheel D is simply a disk attached to shaft E and driven by crank G, which extends back of the chair, within convenient reach of the operator. The face of the wheel is armed with a continuous spiral thread, $d$, of three or more circuits, which converge from the periphery toward the center, as shown in Fig. 3. The wheel is set at an angle, so that while the threads on the lower edge engage with the teeth of the rack those on the upper edge run free of contact.

The special novelty in this case is the tubular construction of the two shanks A′ B′, the slotting of the same, and the insertion of the independent rack-bar C from the inside, whereby the latter is removable at any time for repairs or otherwise, and the teeth project so that the angular wheel can engage. By this arrangement much labor is saved in the fitting of the parts and the dressing out of the teeth.

What we claim, and desire to secure by Letters Patent, is—

The tubular shanks A′ B′ and independent rack C, inserted from the inside of the tube B′, when combined with the threaded wheel C, in the manner and for the purpose specified.

In witness whereof we have hereunto signed our names in the presence of two subscribing witnesses.

ROBERT W. ARCHER.
GEORGE W. ARCHER.

Witnesses:
R. F. OSGOOD,
ARCHIE BAINE.